July 8, 1924.

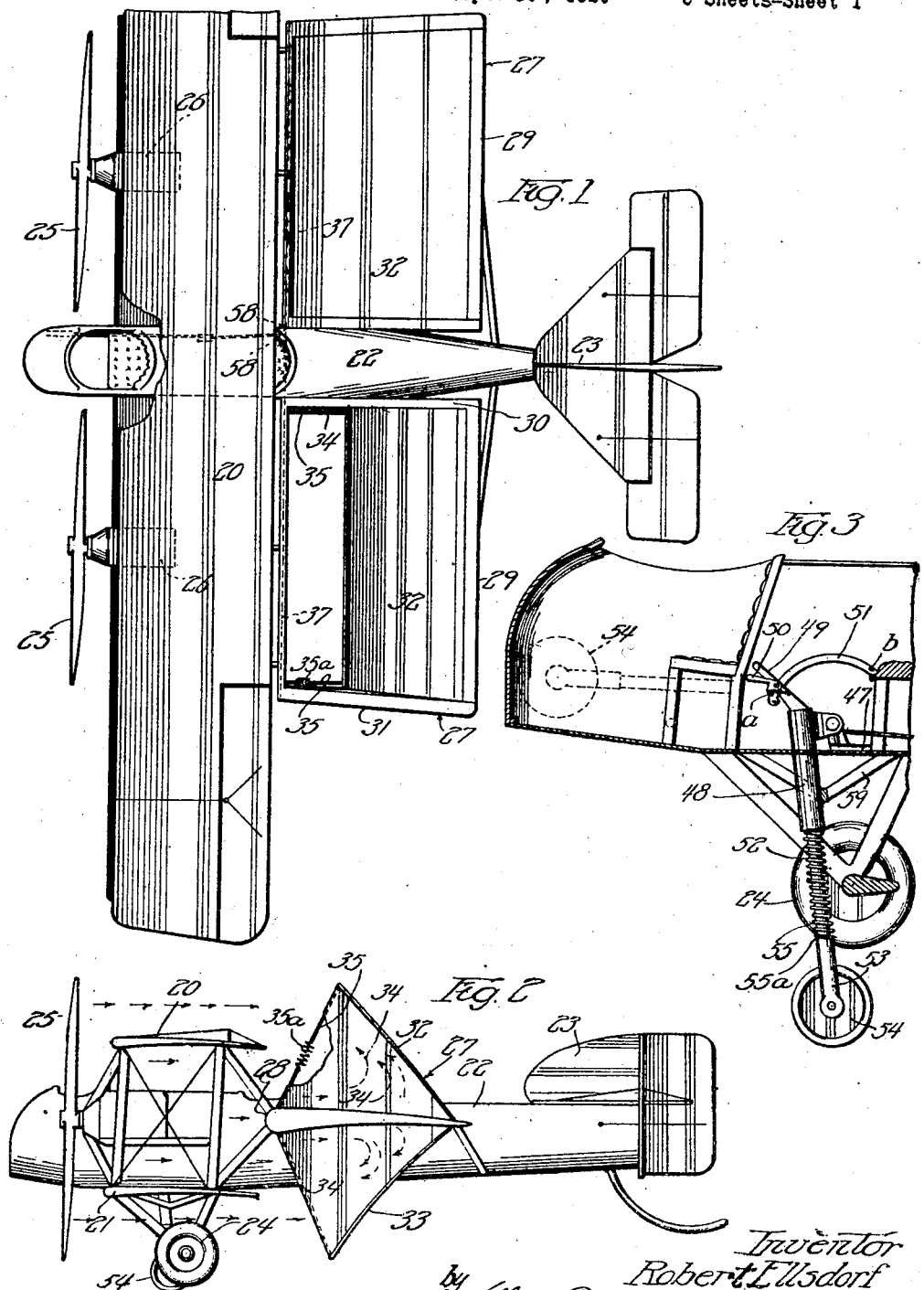

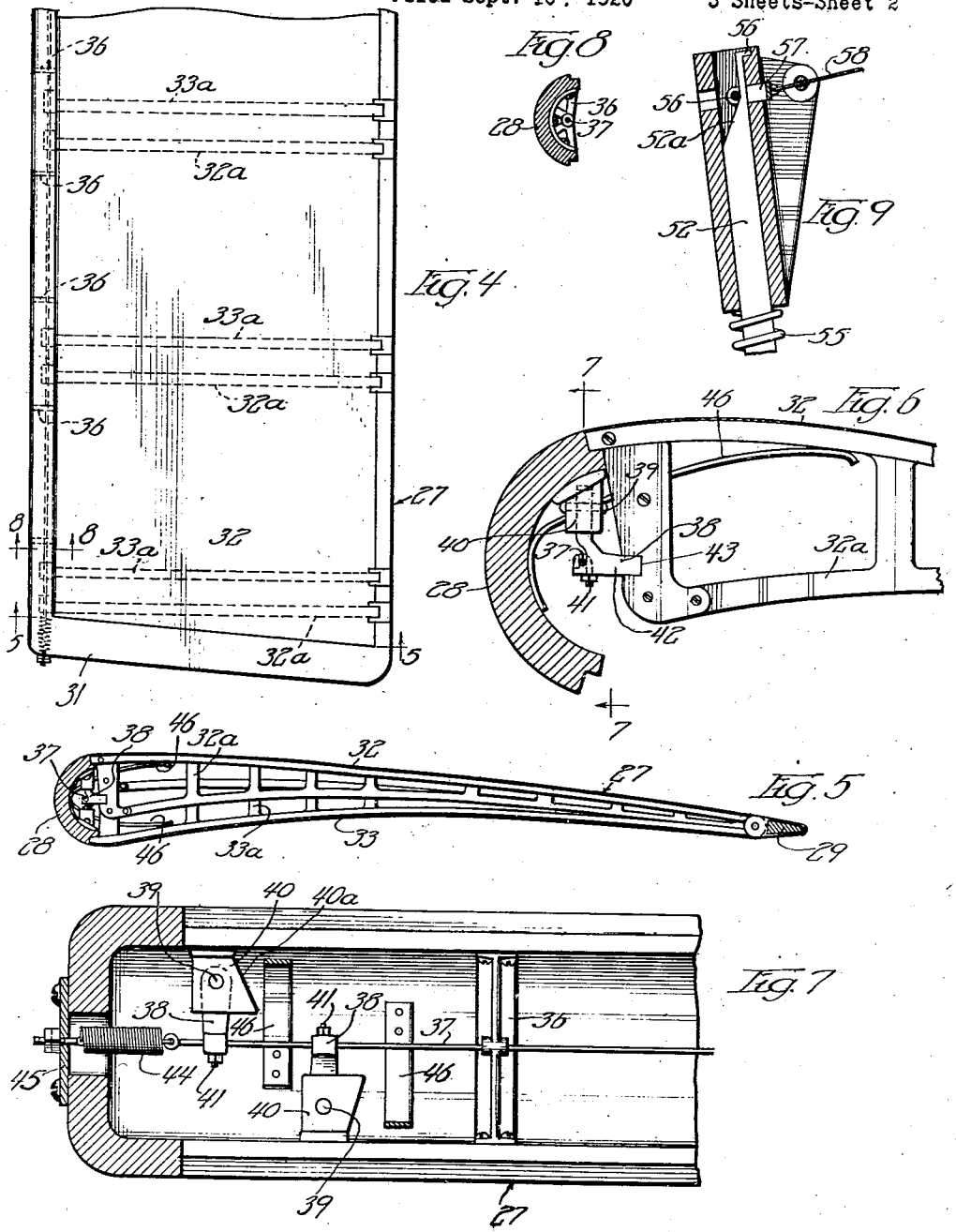

R. ELLSDORF

BRAKE FOR AIRCRAFT

Filed Sept. 10, 1920    3 Sheets-Sheet 3

1,500,184

Inventor
Robert Ellsdorf
by Williams, Bradbury & McCaleb
Attys.

Patented July 8, 1924.

1,500,184

UNITED STATES PATENT OFFICE.

ROBERT ELLSDORF, OF CHICAGO, ILLINOIS.

BRAKE FOR AIRCRAFT.

Application filed September 10, 1920. Serial No. 409,460.

*To all whom it may concern:*

Be it known that I, ROBERT ELLSDORF, a citizen of Germany, and resident of Chicago, in the county of Cook and State of Illinois, have invented a certain new and useful Improvement in Brakes for Aircraft, of which the following is a full, clear, concise, and exact description, reference being had to the accompanying drawings, forming a part of this specification.

My invention contemplates the provision in connection with an air plane or other aircraft, of means which, at the time of landing, may be caused to co-operate with the propeller or propellers of the aircraft quickly to bring the aircraft to rest.

My invention renders it possible, easily and quickly, to land an aircraft at stations of small area due to the fact that the aircraft equipped in accordance with my invention, need not travel any considerable distance after touching the ground.

In the accompanying drawings illustrating my invention,

Figure 1 is a top plan view illustrating a biplane of the two propeller tractor type, equipped with the improvement of my invention.

Figure 2 is a side elevational view illustrating the positions assumed by the braking deflectors when, at the time of landing, the said deflectors are released.

Figure 3 is a fragmentary vertical sectional view taken through the cockpit portion of the fuselage, this view illustrating the devices which cause the releasal of the braking deflectors at the time of landing.

Figure 4 is a fragmentary top plan view of one of the aerofoils which comprise the braking deflectors.

Figure 5 is a sectional view taken on the line 5—5 of Figure 4.

Figure 6 is an enlarged fragmentary section which may also be regarded as taken on line 5—5 of Figure 4.

Figure 7 is a fragmentary sectional view taken on line 7—7 of Figure 6.

Figure 8 is a fragmentary section taken on line 8—8 of Figure 4.

Figure 9 is a vertical section taken through the pivotally mounted casting forming part of the deflector releasing mechanism (shown in elevation in Figure 3.)

Similar characters of reference refer to similar parts throughout the several figures.

Figure 10:
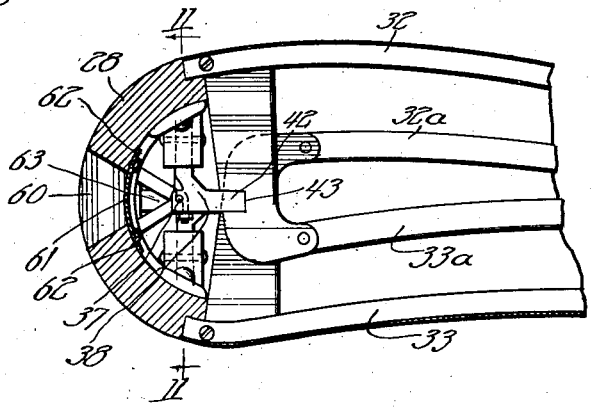
Figure 10 is a view substantially similar to Figure 6 but illustrating a modified arrangement for insuring the forcible opening of the braking deflectors.

Although my invention is not limited in its application to any particular type or style of airplane or other aircraft, I have, in Figures 1 and 2, illustrated my invention as applied to an aircraft comprising the upper and lower wing panels 20 and 21, together with the usual struts, brace wires, flying and landing wires, etc. The particular air plane shown also comprises the fuselage 22, empennage 23, landing gear 24 and the two tractor propellers 25—25. The tractor propellers are disposed on opposite sides of the fuselage in accordance with the usual practice and each propeller is mounted upon the crank shaft of an engine 26.

The construction and general arrangement of the parts thus far mentioned are of no particular importance in so far as my present invention is concerned and hence all of these parts have been shown more or less diagrammatically in the drawings.

Located behind the main planes 20 and 21 and projecting horizontally from the fuselage, are two auxiliary aerofoils, each of which is indicated as a whole by reference numeral 27. It will be noted that each of the auxiliary aerofoils 27 is located in substantially the same horizontal plane as is the axis of the propeller which lies immediately in front of that particular auxiliary aerofoil. Each of the auxiliary aerofoils 27 comprises a substantially rectangular framework comprising the comparatively thick and round-nosed leading edge 28, the comparatively thin and stream lined trailing edge 29 and the inner and outer lateral edges indicated at 30 and 31. The framework in each case is suitably braced and rigidly attached to the fuselage in any satisfactory manner.

Pivoted to the trailing edge 29 of each of the auxiliary aerofoil frameworks are the members 32 and 33 which I prefer to term the deflectors. Each of these deflectors comprises a suitably ribbed framework covered with linen or other satisfactory material so that when the deflectors are in the positions shown in Figure 5, the said deflectors, together with the auxiliary aerofoil frameworks, in effect, constitute complete and properly stream-lined and cambered auxiliary aerofoils.

Attention is directed to the fact that the lateral edges of each pair of deflectors 32 and 33 are connected by suitable fabric webs 34—34 so that when the deflectors are opened, as shown in Figure 2, the said deflectors, together with their connecting webs, will constitute substantially V-shaped pockets which are open only at the front. Flexible cable or other suitable flexible connecting means indicated at 35 are preferably interposed between the forward edges of the deflectors, and auxiliary aerofoil frameworks, in order to limit the opening of the deflectors and thus prevent disruption of the webs 34—34 when the deflectors are forcibly opened in the manner presently to be explained. If desired, spring 35$^a$ may be included in these limiting connections to cushion the otherwise abrupt stopping of the deflectors when the same are opened. The deflector ribs are illustrated at 32$^a$ and 33$^a$. It will be noted that the ribs of the deflectors of each pair alternate and hence do not, in any way, interfere one with the other.

I will now describe one mechanism which may be employed for locking the deflectors 32 and 33 in their closed positions as shown in Figure 5. It is to be understood, however, that the particular means herein shown is purely representative, since the details of the devices for accomplishing this purpose may be varied within wide limits.

Located within the leading edge of each of the auxiliary aerofoils are a number of properly spaced brackets 36, one of which is very clearly shown in Figure 8. These brackets may be retained in position by screws or any other suitable means. Supported by the brackets 36 is a rod 37 which is mounted in the brackets for movement relatively thereto, that is, movement along the inner side of the leading edge 28.

It is the purpose of this rod to afford means for operating the latches 38—38 which serve to lock the deflectors 32 and 33 in closed position. Each of the latches 38 is pivoted at 39 to a bracket 40, each of the brackets 40 being secured to the inner side of the leading edge 28 and being provided with a flange 40$^a$ which prevents its associated latch from swinging beyond a certain point when the rod 37 is pulled as will be presently explained. Each latch is clamped to the rod 37 by a bolt 41 and is provided with a locking finger 42 which normally engages in a notch 43, in the forward end of one of the deflector ribs 32$^a$ and 33$^a$. It will be understood that each rib of each deflector is provided with a notch 43 at its forward end and that a latch 38 is provided to co-operate with each of these notches. A coiled spring 44 acting between the rod 37 and a fixed plate 45 normally holds the rod 33 in the position shown in Figure 7 and therefore, holds the latches 38 in their respective locking positions.

Carried by the leading edge 28 of each of the auxiliary aerofoils, are a plurality of leaf springs 46—46 some of which bear against the framework of the upper deflector 32 and some of which bear against the framework of the lower deflector 33. It is the purpose of these leaf springs 46—46 to urge the deflectors toward their open positions when the several latches 38—38 are disengaged from the deflector rib notches 43—43.

In Figure 1 I have illustrated the deflectors of one of the auxiliary aerofoils as being in their open positions while the deflectors of the other auxiliary aerofoil are shown in their closed positions. It is to be understood, however, that this relation never obtains in flight or when the deflectors are being employed to brake the forward movement of the aircraft over the ground at the time of landing. Prior to flight both of the deflectors of each auxiliary aerofoil are moved to their closed positions and there locked by means of the latches 38—38. The deflectors remain in their closed positions until, at the time of landing, the several latches are moved to their non-locking positions by the means which I will presently describe.

Referring now to Figure 3, it will be seen that the floor of one of the cock-pits is provided with a bracket 47 to which is pivoted the upper end of a sleeve 48, the said sleeve being illustrated in vertical section in Figure 9. The lower end of this sleeve extends through a slot in the cock-pit floor and the sleeve is capable of being moved through a substantial arc around a horizontal axis represented by the pivotal connection between the sleeve and the bracket 47. Formed integral with the sleeve 48 or otherwise suitably attached thereto, is an operating lever 49 provided with a spring-operated pawl 50 that is adapted to co-operate with a quadrant 51. This quadrant is provided with two notches $a$ and $b$. Mounted within the sleeve 48 is a plunger 52 provided with a bifurcated lower end 53 in which is carried a comparatively small and preferably pneumatic tired wheel 54. A comparatively heavy compression spring 55 is disposed around the plunger 52 and acts between the lower end of the sleeve 48 and a shoulder 55ᵃ which is formed upon the plunger 52 as is very clearly shown in Figure 3.

It will thus be understood that the spring 55 normally retains the plunger 52 in the position shown in Figures 3 and 9 and retains the offset upper end 56 of the plunger in engagement with its co-operating abutment which is provided by the sleeve 48 as is most clearly shown in Figure 9. Near its upper end, the plunger 52 is provided with a cam portion 52ᵃ which co-operates with a roller 56 carried by an element 57 which is mounted for transverse reciprocatory movement in the sleeve 48. Attached to the member 57 is a flexible cable 58 which leads rearwardly through the fuselage to a point immediately behind the rear cock-pit seat. At this point the flexible connection divides, each of the two portions passing around a pulley 58 and being attached to the locking rod 37 of one of the auxiliary aerofoils 27. It will thus be seen that when the plunger 52 is moved upwardly within the sleeve 48, the member 57 will be moved to the left (Figure 9) due to the co-operation of the cam surface 52ᵃ with the roller 56. Movement of the member 57 is transmitted to the flexible connection 58 to the two deflector locking rods 37 and these rods are simultaneously moved against the tension of their associated springs 44 (Figure 7) thereby causing the unlocking of the braking deflectors.

Prior to flight the operating lever 49 (Figure 3) is moved to its rear position so that the pawl 50 thereof engages in the notch *b* of quadrant 51. In this case, the sleeve 48 and plunger 52 are caused to assume the substantially horizontal positions illustrated in dotted lines in Figure 3. The several braking deflectors 32 and 33 are now locked in the positions shown in Figure 5. The deflectors remain locked during flight. While the aircraft is in flight, the auxiliary aerofoils 27—27, in effect, constitute auxiliary supporting surfaces.

When the pilot is about to make a landing, he moves the operating lever 49 to the position shown in Figure 3 in which case, the pawl 50 thereof engages in the notch *a* of the quadrant 51. This movement of the lever 49, of course, moves the sleeve 48 and plunger 52 to the positions shown in full lines in Figure 3. With the air plane in flight, the rearward movement of the sleeve 48 and plunger 52 is apt to be quite swift and in order to limit the rearward movement of these parts, I provide a bracket 59 which engages the sleeve 48 when the latter reaches the position shown in full lines of Figure 3. It will be understood, of course, that the bracket 59 may, if desired, be provided with any suitable cushioning means. It will furthermore be understood that the limiting and cushioning means might just as well be in the form of means carried by the under carriage. Attention is directed to the fact that when the lever 49 is in the position shown in Figure 3, the sleeve 48 and plunger 52 project downwardly and are slightly inclined to the rear. When the air plane makes a landing, the wheel 54 is the first part to engage the ground. Immediately upon engagement of the wheel 54 with the ground, the plunger 52 is moved upwardly against the compression of spring 55. This upward movement of the plunger causes the unlocking of the braking deflectors in the manner hereinbefore described. As soon as the deflectors have been unlocked, the leaf springs 46—46 (Figure 6) serve to urge the braking deflectors toward their open positions. Just as soon as the deflectors are slightly open, they are quickly moved to the fully opened positions shown in Figure 2 due to the fact that the under surfaces of the deflectors 32—32 and the upper surfaces of the deflectors 33—33 are caught in the slip streams of the propellers 25—25. The opening movement of the deflectors is, of course, limited by the chains or cables 35—35. It is desirable that the pilot, while volplaning toward the point of landing, should throttle his engines. However, as soon as the wheel 54 has touched the ground and the braking deflectors have opened, the engine throttles should be opened so that the propellers rotate at comparatively high speed. In this case, the braking deflectors and their associated end webs 34—34 serve to trap the slip streams of the propellers 25—25. Due to the inclination of the deflectors and the fact that the pockets afforded by the deflectors and their associated end webs are open at the front, the direction of the propeller slip streams is turned, as indicated by the arrows in Figure 2, with the result that the air is forced to leave the deflectors in lines inclined forwardly and upwardly and downwardly with respect to the line of movement of the air plane over the ground. The air thus leaving the deflectors serves to oppose the forward movement of the air plane over the ground and very quickly brings the same to rest.

Figure 11:
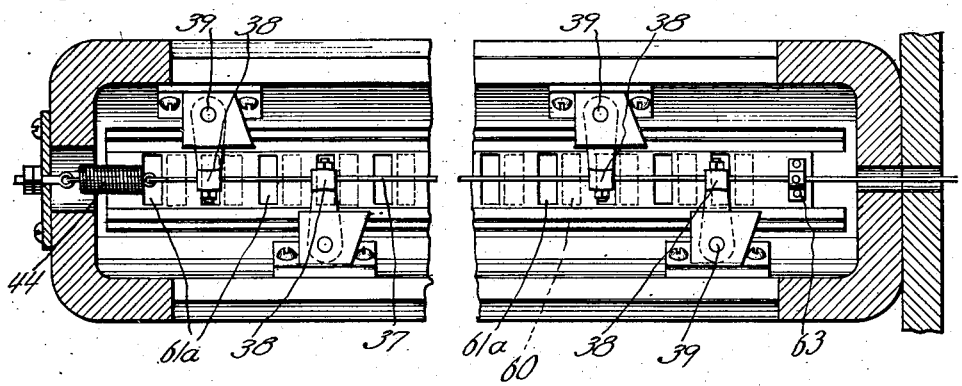
Figure 11 is a sectional view taken on line 11—11 of Figure 10.

The modified auxiliary aerofoil construction illustrated in Figures 10 and 11 differs from that shown in the preceding figures only in that the deflector opening springs 46—46 are omitted and in the further fact that different means is provided for insuring the opening of the deflectors when they are unlocked in the manner hereinbefore described.

Referring to Figures 10 and 11, which show one of the modified auxiliary aerofoils, it will be noted that the leading edge 28 thereof is provided with a plurality of holes 60—60. These holes, however, are normally closed by a plate 61 which is rigidly attached to the locking bar 37 by a bracket 63 and is adapted to be shifted with the locking bar. The said plate 61 is provided with a plurality of openings 61ª adapted to register with the holes 60—60 when the several braking deflectors 32 and 33 are unlocked. The leading edge 28 is desirably provided with guides 62—62 which embrace the sliding plate 61. When the air plane is in flight the plates 61 prevent the ingress of air through the openings 60—60. However, when, at the time of landing, the locking rods 37 are shifted to unlock the braking deflectors, the plates 61 are likewise shifted to uncover the openings 60—60. With these openings uncovered, the air from the propellers rushes into the auxiliary aerofoil and causes the braking deflectors to be quickly moved to their opened positions.

I consider that the salient feature of my present invention consists in the provision of the braking deflectors which, at the time of landing, change the direction of a propeller slip stream and thus serve to break the movement of the aircraft.

While I have illustrated my invention as applied to a biplane of the two tractor-propeller type, it will be understood that my invention is not, in any way, limited to this particular style of air plane or in fact, to any particular type of aircraft. Furthermore, while I prefer that the braking deflectors shall form part of auxiliary aerofoils as herein described, I appreciate the fact that the location of the braking deflectors may be varied within wide limits. It is important, however, that the braking deflectors be supported in the propeller slip stream and that they be so held that when the aircraft is in flight, they will not materially increase the head resistance thereof. The specific means herein shown for locking the deflectors in their closed positions and the means for automatically unlocking the deflectors at the time of landing may, of course, be varied within wide limits.

Therefore, I do not limit myself to the specific construction and arrangement of parts herein shown and described but desire to cover all equivalent embodiments of my invention coming within the terms and spirit of the appended claims.

What I claim is new and desire to secure by Letters Patent of the United States is:—

1. In an aircraft, the combination with the propeller thereof of a pair of deflectors carried by the aircraft, and located in the propeller slip stream, said deflectors being normally disposed edgewise to the propeller axis, but being capable of movement to positions such that they are inclined relatively to the propeller axis and constitute a substantially V-shaped box closed at its apex and disposed with the open side thereof facing the propeller so that the slip stream is diverted along lines such that the deflected air opposes forward movement of the aircraft.

2. In an aircraft, a main supporting wing, an auxiliary supporting wing formed of two substantially flat sections hinged at their rear edges to the frame back of said main wing, means normally retaining said sections substantially parallel to each other, means for releasing said retaining means, and means for moving the free edges of said sections mutually away each from the other, whereby a substantially V-shaped braking surface is provided.

3. In an aircraft, a main supporting wing, a pair of auxiliary supporting wings, each formed of two substantially flat sections hinged at their rear edges to the frame back of said main wing, means normally retaining the sections of each pair substantially parallel to each other, means for releasing said retaining means, and means for moving the free edges of said sections mutually away each from the other, whereby a substantially V-shaped braking surface is provided.

4. In an aircraft, the combination with the propeller thereof of deflectors carried by the aircraft and located in the propeller slip stream, the deflectors being normally disposed edgewise to the normal path of the slip stream, but being capable of movement to positions wherein they divert the slip stream along lines such that the deflected air opposes forward movement of the aircraft, means for locking the deflectors in their positions edgewise to the normal direction of the slip stream, and means adapted automatically to unlock the deflectors at the time of landing.

5. In an aircraft, the combination with the propeller thereof of deflectors carried by the aircraft and located in the propeller slip stream, the deflectors being normally disposed edgewise to the normal path of the slip stream, but being capable of movement to positions wherein they divert the slip stream along lines such that the deflected air opposes forward movement of the aircraft, means for locking the deflectors in their positions edgewise to the normal direction of the slip stream, and deflector unlocking mechanism comprising means carried by the aircraft and operated by impact with the ground at the time of landing.

6. In an airplane, comprising a propeller, an auxiliary aerofoil carried by the airplane, and located behind the propeller in the slip stream thereof, said auxiliary aerofoil comprising a framework and a pair of deflectors pivoted at their rearward edges to the framework, means for locking the deflectors in the frame so that the deflectors constitute upper and lower surfaces of the said auxiliary aerofoil, and means for unlocking the deflectors so that the same may assume positions wherein they intercept a substantial portion of the propeller slip stream.

7. In an airplane, the combination with the propeller thereof, of deflectors carried by the airplane and located in the propeller slip stream, the deflectors being normally disposed so that they contribute a minimum of head resistance to the airplane, said deflectors adapted to be moved to positions such that they intercept a substantial portion of the air of the propeller slip stream, and divert the same in such a direction that the deflected air opposes forward movement of the airplane, means for locking the deflectors in their aforesaid normal positions, and means engageable with the ground arranged automatically to unlock the deflectors at the time of landing.

8. In an aircraft, the combination with the propeller thereof, of a set of deflectors in the propeller slip stream, said deflectors being disposed normally edgewise to the propeller axis and arranged to move to positions where they together constitute a substantially V-shaped box, closed at its apex and having its open side facing said propeller, the apex of said box being disposed on a horizontal line passing through the axis of rotation of the propeller, so that said box may intercept and divert practically the entire propeller slip stream and thus quickly bring the aircraft to rest.

9. In an aircraft comprising a propeller, means for exerting a braking action on the craft when landing, comprising deflectors disposed in the propeller slip stream with their edges disposed normally edgewise to the propeller axis, and capable of movement to positions where they intercept and divert the propeller slip stream passing the sustaining aerofoils of the craft, means for locking said deflectors in their normal edgewise positions, comprising a plurality of latches, means for urging said deflectors from locked position, and means operated on impact with the ground at the time of landing for actuating said latches to unlock said deflectors, comprising an auxiliary landing gear disposed normally in raised, inoperable position, and moved to lowered operating position on landing, said gear comprising a member arranged to be moved when said craft impacts with the ground when landing, said member having connection with said latches so that the unlocking of said deflectors is simultaneous with the first impact with the ground at the time of landing.

10. In an aircraft, means for exerting a braking action on the craft when landing comprising deflectors disposed with their edges substantially on a horizontal line and capable of movement to positions where they intercept and divert the air currents passing the sustaining aerofoils of the craft, means for locking said deflectors in their normal edgewise positions, comprising a plurality of latches, means for urging said deflectors from locked position, and means operated on impact with the ground at the time of landing for actuating said latches to unlock said deflectors, comprising an auxiliary landing gear disposed normally in raised, inoperable position, and moved to lowered operating position on landing, said gear comprising a member arranged to be moved when said craft impacts with the ground when landing, said member having connection with said latches so that the unlocking of said deflectors is simultaneous with the first impact with the ground at the time of landing.

11. In an aircraft, means for exerting a braking action on the craft when landing comprising deflectors disposed with their edges substantially on a horizontal line and capable of movement to positions where they intercept and divert the air currents passing the sustaining aerofoils of the craft, means for locking said deflectors in their normal edgewise positions, means for urging said deflectors from locked position, and means operated by impact with the ground at the time of landing for actuating said locking means to unlock said deflectors, comprising an auxiliary landing gear disposed normally in raised, inoperable position, and moved to lowered operating position on landing, said gear comprising a member arranged to be moved when said craft impacts with the ground when landing, said member having connection with said deflector locking means so that the unlocking of said deflectors is simultaneous with the first impact with the ground at the time of landing.

12. In an aircraft, means for exerting a braking action on the craft when landing, comprising deflectors disposed with their edges in a substantially horizontal plane and capable of movement to positions where they intercept and divert the air currents passing the sustaining aerofoils of the craft, means for locking said deflectors in their normal edgewise positions, means for urging said deflectors from locked position, and means operated upon impact with the ground at the time of landing to actuate said deflector locking means to unlock said deflectors, said means comprising a member arranged to be moved when said craft impacts with the ground at the time of landing, so that the unlocking of said deflectors is simultaneous with the first impact with the ground.

13. In an aircraft, a supporting wing positioned in the propeller slip stream, said wing consisting of two substantially flat sections hinged to the frame at their rear edges, means normally retaining said sections in substantially parallel relation, means for releasing said retaining means, and means for moving the free edges of said sections away from each other and from their normal positions whereby a substantially V-shaped braking surface is provided.

In witness whereof, I hereunto subscribe my name this 4th day of September, 1920.

ROBERT ELLSDORF.

Witnesses:
ANDREW WINTERCORN,
ARTHUR W. CARLSON.